UNITED STATES PATENT OFFICE.

ARMAND MÜLLER-JACOBS, OF NEW YORK, N. Y., ASSIGNOR TO WILLIAM W. AVERY AND CATHARINA MÜLLER-JACOBS, OF SAME PLACE.

MANUFACTURE OF SUBSTANCES FROM ROSIN-OILS.

SPECIFICATION forming part of Letters Patent No. 631,749, dated August 22, 1899.

Application filed March 2, 1898. Renewed February 25, 1899. Serial No. 706,879. (No specimens.)

*To all whom it may concern:*

Be it known that I, ARMAND MÜLLER-JACOBS, a citizen of the Swiss Republic, residing at New York, in the county of New York and State of New York, have invented certain new and useful Improvements in the Manufacture of Substances from Rosin-Oils; and I do hereby declare the following to be a full, clear, and exact description of the invention, such as will enable others skilled in the art to which it appertains to make and use the same.

This invention relates to the treatment of oils.

The object is in a ready, efficient, and comparatively inexpensive manner to produce substances useful as substitutes for shellac and other gums and an oil useful for lubricating and other purposes.

The invention consists generally in the manufacture of gum or resinous substance and of lubricating-oil.

The invention consists, specifically, in the process of producing from rosin-oil an oil useful as a lubricant and for other purposes and gums or resinous substances useful as substitutes for shellac and other gums by treating the rosin-oil with sulfuric acid, converting the resulting sulfo-acids into water-soluble alkali salts, removing the oil, and treating the remaining liquid with acid or with soluble salt or salts of an alkaline earth or a metal forming corresponding precipitates, and then washing and drying the matter precipitated.

The invention consists, furthermore, in the novel steps of the procedure; and finally the invention consists in the novel products of the same.

To carry the invention into effect particularly, I proceed as follows: To one hundred parts of rosin-oil add under continuous stirring from thirty to fifty parts of sulfuric acid of 66° Baumé. As soon as the mixture reaches the temperature of 50° centigrade add at once three hundred parts of cold water and continue the stirring until a thick homogeneous mixture is produced. This mixture should be allowed to stand for a period of from twenty-four to forty-eight hours or until a complete separation of most of the uncombined, unchanged, or free sulfuric acid from the newly-formed oily substance shall have taken place. The whole of the unchanged sulfuric acid is then removed by careful draining off and subsequent washing of the oily substance with cold or luke-warm water. To the oily substance left then add so much caustic potash, soda, or ammonia as to produce a clear neutral solution. This neutral solution is an intermediate product, which I will designate "No. 1," consisting of changed oily or resinous matter and unchanged oil and is a potassium, sodium, or ammonium salt of the sulfonic acids of rosin-oil prepared, as above shown, by treatment of rosin-oil with sulfuric acid, subsequent washing, and neutralization with an alkali. It is soluble in water and is by boiling with water decomposed into products Nos. 2 and 3, as follows: Dissolve this intermediate product No. 1 in from three to six parts of water, which will form a white emulsion, and boil the entire mixture for one or two hours or until all the oil which forms the emulsion is brought to the surface. Then remove this oil. The oil thus removed, which I designate "No. 2," is a fixed oil of a brownish-yellow color, clear and non-fluorescent, is neutral and tasteless, has a slight odor, but one entirely different from that of rosin-oil, has a specific gravity of 0.97 to 0.98, ($H_2O=1.0$,) evaporates at a temperature of from 150° to 160° centigrade, and is also a sulfo compound, but practically insoluble in water and alcohol and soluble in ether, chloroform, spirits of turpentine, carbon bisulfid, benzin, benzol, &c., has a neutral reaction, and does not saponify with alkalies nor with sulfuric acid if properly prepared. It may further be recognized by yielding on distillation an oily, very mobile, thin liquid of a specific odor and nearly colorless, consisting of different hydrocarbons, which can easily be distinguished on fractional distillation and by differences of specific gravity, the average of the whole being about 0.825, and which I may designate "No. $2^a$," and also yielding a thick dark-colored varnish-like body which remains in the retort and contains all the sulfur, which I may designate as "No. $2^b$." This oil "No. 2" being of good body and practically free from all solid ingredients of the rosin-oil, as such, and from extraneous matter, acids, &c., and being tenacious, not readily oxidizable, and non-gummy, presents a substance admirably adapted as an oil for lubricating and other purposes where a fine, fluent, and pure oil is a desideratum, and it may also enter into the composition of new varnishes, as will hereinafter appear. Upon removal of this oil there remains a clear, neutral, or alkaline liquid, which I designate "No. 3," which is a solution of the alkaline sulfonic-acid salts of the rosin-oil after boiling with water, and by adding to this liquid a dilute acid, such as a sulfuric or muriatic acid, precipitating the soluble alkaline salts of the sulfonic acids of rosin, a body is obtained like Venetian turpentine, which I designate "No. 4." This matter, in the nature of a gum, after washing with cold water contains about thirty per cent. of water, is white, opaque, and hard and brittle when cold, begins to get soft at temperatures beyond 75° Fahrenheit, has a specific gravity of 1.0, is soft between the teeth, like chewing-gum, is tasteless and odorless, and is very soluble in alcohol and all other solvents and also in alkalies; but coatings of this solution on paper, wood, &c., dry very slowly and remain soft and sticky.

Precipitating the liquid No. 3 with the soluble salts of an alkaline earth or a metal such as salts of magnesium, calcium, barium, aluminium, zinc, &c., as may be desirable to obtain the corresponding precipitates, the precipitate product, which I designate "No. 5" is obtained. This product is a gum, which after washing with cold water contains about thirty per cent. of water, is of an opaque white color, is softer in cold than in boiling water, wherein it becomes hard and brittle like bleached shellac, is soluble in alcohol and other solvents, but insoluble in alkalies, has a specific gravity of 1.07 to 1.10, is tasteless and odorless, has a melting-point after evaporation of its water of 125° to 130° centigrade, burns with a yellow flame with much less smoke than rosin and with an entirely different smell, differs from shellac, and coatings with it dry quickly like shellac-varnish and are very hard and very brilliant and by the action of light become insoluble. Dried, this product is dark, and I may designate it as "No. 5ª." The precipitates thus formed should be carefully washed and dried and, being soluble in benzol, turpentine, alcohol, &c., are efficient substitutes for shellac, gums, &c. The commercial product will have so much acid added as may be necessary to create hard, dry, and brilliant coatings under any and all conditions of temperature.

The dried product No. 5ª, together with No. 2, forms the essential part of new varnishes, though the artificial gums prepared as above set forth may be dissolved or mixed by themselves in or with spirits of turpentine, benzin, benzol, or other suitable solvents. The varnishes thus made contain a much larger amount of sulfur in organic combination than any other varnish at present known, and this may be determined by well-known chemical reactions. They also contain a larger quantity of the oxid of the metals of alkaline earths, and this may be determined by analyzing the ashes. The practical properties of the varnishes are equal, if not superior, to those of the best varnishes made from ethers of resinous acids, (as the natural gums, copal, amber, and dammar, &c.,) and they dry quickly and do not become brittle under the action of sunlight or moisture or other atmospheric influences.

Having thus described my invention, what I claim, and desire to secure by Letters Patent, is—

1. The process of producing a water-soluble salt of the sulfonic acids of rosin-oil, which consists in treating rosin-oil with sulfuric acid, then causing separation from the mass of any free acid, and then neutralizing the newly-formed oily substance left with an appropriate alkali, substantially as described.

2. The process of producing, from rosin-oil, an oil suitable for a lubricant and other purposes, which consists in treating rosin-oil with sulfuric acid, then causing separation from the mass of any free acid, then neutralizing the newly-formed oily substance left with an appropriate alkali, and then mixing and boiling it in water, until the oil is brought to the surface, substantially as described.

3. The process of producing a solution of the alkaline sulfonic-acid salts of rosin-oil, which consists in treating rosin-oil with sulfuric acid, then causing separation from the mass of any free acid, then neutralizing the newly-formed oily substance left with an appropriate alkali, then mixing and boiling it in water, until the oil is brought to the surface, and then removing this oil, leaving a clear liquid, substantially as described.

4. The process of producing a substance in the nature of a gum, from rosin-oil, which consists in treating rosin-oil with sulfuric acid, then causing separation from the mass of any free acid, then neutralizing the newly-formed oily substance left, with an appropriate alkali, then mixing and boiling it in water, until the oil is brought to the surface, then removing this oil, leaving a clear liquid, and then adding to this liquid a dilute acid, precipitating the soluble alkali salts of the sulfonic acids of the rosin, substantially as described.

5. The process of producing, from rosin-oil, a substance suitable as an immediate substitute for shellac, &c., in varnishes, which consists in treating rosin-oil with sulfuric acid, then causing separation from the mass of any free acid, then neutralizing the newly-formed oily substance left with an appropriate alkali, then mixing and boiling it in water, until the oil is brought to the surface, then removing this oil, leaving a clear liquid, and then adding to this liquid a soluble salt of an alkaline earth or a metal, substantially as described.

6. The intermediate product, substantially as hereinbefore set forth, being a salt of the sulfonic acids of rosin-oil or a sulfo compound, prepared by treating oil with sulfuric acid and subsequent washing and neutralizing with an alkali, soluble in water and decomposable by boiling with water into a fixed oil and a clear liquid.

7. A fixed oil produced from rosin-oil, being a sulfo compound practically insoluble in water and alcohol, but soluble in ether, chloroform, turpentine, bisulfid of carbon, benzin, benzol, &c., neutral and tasteless, with an odor different from that of resin-oil, having a specific gravity of 0.97 to 0.98 and a neutral reaction, and being non-saponifiable with alkalies or with sulfuric acid, practically free from all solid ingredients of rosin-oil and from extraneous matter, acids, &c., and non-oxidizable and non-gummy, and presenting a tenacious but fluent oil, substantially as described.

8. The clear, neutral, or alkaline liquid hereinbefore set forth, remaining after the removal of the fixed oil, being a solution of the alkaline sulfonic acid salts of the rosin-oil, after boiling with water, and capable of being precipitated by an acid or with the soluble salts of an alkaline earth or a metal, yielding gummy substances, substantially as described.

9. A gum-like substance produced from rosin-oil, white, opaque and like Venetian turpentine, and hard and brittle, when cold, but softening at temperatures from 75° Fahrenheit, upward, soft between the teeth like chewing-gum, having a specific gravity of 1.0, tasteless and odorless and soluble in alcohol and all other solvents, and, also, in alkalies, substantially as described.

10. An opaque, gum-like substance produced from rosin-oil, of white color, softer in cold than in boiling water, wherein it becomes hard and brittle, like bleached shellac, soluble in alcohol and other solvents, but insoluble in alkalies, having a specific gravity of 1.07 to 1.10, tasteless and odorless, having a melting-point, after drying, of 125° to 130° centigrade, and burning with a yellow flame, with much less smoke than rosin, and with a different odor, and forming, on suitable solution, varnishes presenting very brilliant coatings, substantially as described.

In testimony whereof I have hereunto affixed my signature in the presence of two witnesses.

ARMAND MÜLLER-JACOBS.

Witnesses:
W. W. AVERY,
CHRIS. SCHNEIDER.